US008903594B2

(12) United States Patent
Sakuma et al.

(10) Patent No.: US 8,903,594 B2
(45) Date of Patent: Dec. 2, 2014

(54) DRIVING DIAGNOSIS APPARATUS AND PROGRAM FOR SAME

(75) Inventors: Yasushi Sakuma, Chita-gun (JP); Yasuyuki Itoh, Ichinomiya (JP); Kazunao Yamada, Toyota (JP); Yusuke Mizuno, Kariya (JP)

(73) Assignee: DENSO CORPORATION, Kariya (JP)

( * ) Notice: Subject to any disclaimer, the term of this patent is extended or adjusted under 35 U.S.C. 154(b) by 350 days.

(21) Appl. No.: 13/176,048

(22) Filed: Jul. 5, 2011

(65) Prior Publication Data

US 2012/0010773 A1 Jan. 12, 2012

(30) Foreign Application Priority Data

Jul. 8, 2010 (JP) ................................ 2010-155889

(51) Int. Cl.
*G01M 17/00* (2006.01)
*G07C 5/08* (2006.01)

(52) U.S. Cl.
CPC .............. *G07C 5/0808* (2013.01); *G07C 5/085* (2013.01)
USPC ........................................ 701/29.1; 701/29.2

(58) Field of Classification Search
CPC .............................. G07C 5/085; G07C 5/0808
USPC .......................................... 701/29, 29.1, 29.2
See application file for complete search history.

(56) References Cited

U.S. PATENT DOCUMENTS

2007/0213920 A1 9/2007 Igarashi et al.
2010/0235038 A1 9/2010 Itoh
2010/0235062 A1* 9/2010 Moriya et al. .................. 701/68

* cited by examiner

*Primary Examiner* — John Q Nguyen
*Assistant Examiner* — Jordan S Fei
(74) *Attorney, Agent, or Firm* — Posz Law Group, PLC

(57) ABSTRACT

When an accelerator is put in an OFF state to decelerate a vehicle and perform inertia travel with supply of fuel being cut off, measurement of an accelerator OFF lapse time is started. When a travel speed falls down to be lower than a pre-stop speed, a measured lapse time is stored in a memory, with the measurement of the lapse time being further continued. After finishing a travel of a downward slope, the travel speed is reduced to fall down to the pre-stop speed again, a lapse time continuously measured up to that time is updated in the memory. When the travel speed falls to a stop speed, the measurement of the lapse time is finished and the continuously-measured lapse time is determined as a required stop time of the vehicle. As the required stop time increases, driving is diagnosed as being fuel-efficient.

12 Claims, 4 Drawing Sheets

FIG. 3

| EVALUATION POINT (FUEL EFFICIENCY) | STOPPING TIME |
|---|---|
| 100 | T>6.0 |
| 95 | T>5.5 |
| 90 | T>5.1 |
| 85 | T>4.8 |
| 80 | T>4.5 |
| 75 | T>4.2 |
| 70 | T>3.9 |
| 65 | T>3.6 |
| 60 | T>3.3 |
| 55 | T>3.0 |
| 50 | T>2.7 |
| 45 | T>2.4 |
| 40 | T>2.1 |
| 35 | T>1.8 |
| 30 | T>1.5 |
| 25 | T>1.2 |
| 20 | T>1.0 |
| 15 | T>0.8 |
| 10 | T>0.7 |
| 5 | T>0.6 |
| 0 | T≤0.6 |

FIG. 4

| | Vst>60 | Vst>55 | ⋯ | Vst>25 | Vst≤20 |
|---|---|---|---|---|---|
| T>6.0 | 100 | 100 | | 100 | 100 |
| T>5.5 | 95 | 100 | | 100 | 100 |
| T>5.1 | 90 | 95 | | 100 | 100 |
| T>4.8 | 85 | 90 | | 100 | 100 |
| T>4.5 | 80 | 85 | | 100 | 100 |
| T>4.2 | 75 | 80 | | 100 | 100 |
| ⋮ | ⋮ | ⋮ | ⋮ | ⋮ | ⋮ |
| T>1.2 | 25 | 30 | | 50 | 50 |
| T>1.0 | 20 | 25 | | 40 | 40 |
| T>0.8 | 15 | 20 | | 30 | 30 |
| T>0.7 | 10 | 15 | | 20 | 20 |
| T>0.6 | 5 | 10 | | 10 | 10 |
| T≤0.6 | 0 | 0 | | 0 | 0 |

DRIVING DIAGNOSIS APPARATUS AND PROGRAM FOR SAME

CROSS REFERENCE TO RELATED APPLICATION

This application is based on and incorporates herein by reference Japanese patent application No. 2010-155889 filed on Jul. 8, 2010.

FIELD OF THE INVENTION

The present invention generally relates to a driving diagnosis apparatus, which measures duration of a fuel cutoff time in a vehicle while the vehicle speed is reduced, and also relates to a program product of the driving diagnosis apparatus.

BACKGROUND OF THE INVENTION

Conventionally, a vehicle traveling with its accelerator released (i.e., in an accelerator released state, or in an accelerator OFF state) stops fuel supply to an internal combustion engine, when the rotation number of the engine per unit time (engine rotation speed) is high, and provides a required amount of fuel to the engine when the engine rotation speed is low, for maintaining an idle state of the engine. The above fuel supply scheme is designated as fuel cutoff.

It is proposed by JP 2005-337229A (US 2007/0213920 A1), for example, to perform a driving diagnosis for determining a degree of fuel-efficient driving, based on measurement of travel time of the vehicle in the accelerator OFF and coasting (travel by inertia) state during a deceleration time of the vehicle.

It is also proposed by JP 2010-209834A (US 2010/0235038 A1), for example, to measure a time length after a deceleration of a subject vehicle under a set speed while a travel speed of the vehicle is under the set speed. In this proposal, a time of the travel of the vehicle with its accelerator position being released (i.e., traveling in the accelerator OFF state) is designated as a required stopping time.

As one of operation states of the vehicle, the subject vehicle travels a road including a downward slope, for a period of time (i) from a starting time of a deceleration by putting the accelerator in the accelerator OFF state, (ii) to a stop of the subject vehicle at a target stop position, without putting the accelerator in an accelerator ON state.

In such a situation, the conventional driving diagnosis technique, as exemplified in FIG. 6, after starting (time t21) a deceleration by putting the accelerator in an OFF state (i.e., throttle opening is zero), measurement of lapse time T1 is started at a time (time t22) when the travel speed of the subject vehicle falls down below a set speed V2. Then, if the road traveled by the subject vehicle turns downward (time t23), to lead to acceleration of the subject vehicle to have the travel speed exceeding the set speed V2 (time t24), the conventional driving diagnosis technique typically ends the measurement of the lapse time (T1 in FIG. 6). Then, the deceleration of the subject vehicle is re-started to have the travel speed of the subject vehicle fall down under the set speed V2 (time t25) after ending the travel on the downward road, and measurement of the lapse time (T2 in FIG. 6) is newly started, and the newly-started measurement of the lapse time T2 continues until the subject vehicle stops (time t26).

In this example, even when the vehicle continuously accelerates and decelerates during coasting (travel by inertia), the conventional driving diagnosis technique measures the required stopping time twice in one continuance of such coasting, thereby deteriorating measurement accuracy of required stopping time T and a degree of driving fuel-efficiency.

SUMMARY OF THE INVENTION

It is therefore an object of the present invention to provide a driving diagnosis apparatus that improves measurement accuracy of the required stopping time of a vehicle traveling in a situation of continuous acceleration and deceleration during coasting by inertia.

According to one aspect of the present invention, driving diagnosis is performed in a vehicle, in which a fuel cutoff operation is performed in an accelerator OFF state of the vehicle such that (i) fuel supply to an internal combustion engine is stopped when a rotation speed of the engine is higher than a predetermined fuel cutoff speed, and (ii) the fuel supply to the engine is started when the rotation speed of the engine is equal to or lower than a predetermined set speed lower than the predetermined fuel cutoff speed. For the driving diagnosis, an operation of an accelerator of a vehicle and a travel speed of the vehicle are acquired. Lapse time of the accelerator OFF state is measured, and the lapse time measured up to a time point, at which the travel speed of the vehicle becomes equal to or lower than a predetermined pre-stop speed that indicates a travel speed of the vehicle driven by the engine rotating at the predetermined set speed. The stored lapse time is used as a required stopping time, when the travel speed of the vehicle is equal to or lower than a predetermined stop speed that is smaller than the pre-stop speed. The required stopping time indicates a time length of inertia travel of the vehicle under the fuel cutoff operation. The lapse time measurement is continued until the travel speed falls to the stop speed, if the accelerator remains in the accelerator OFF state.

BRIEF DESCRIPTION OF THE DRAWINGS

The above and other objects, features and advantages of the present invention will become more apparent from the following detailed description made with reference to the accompanying drawings. In the drawings:

FIG. 3 is a table of a driving diagnosis data map used for a driving diagnosis;

FIG. 4 is a table of modification of the driving diagnosis data map used for the driving diagnosis;

DETAILED DESCRIPTION OF THE PREFERRED EMBODIMENT

Figure 1:
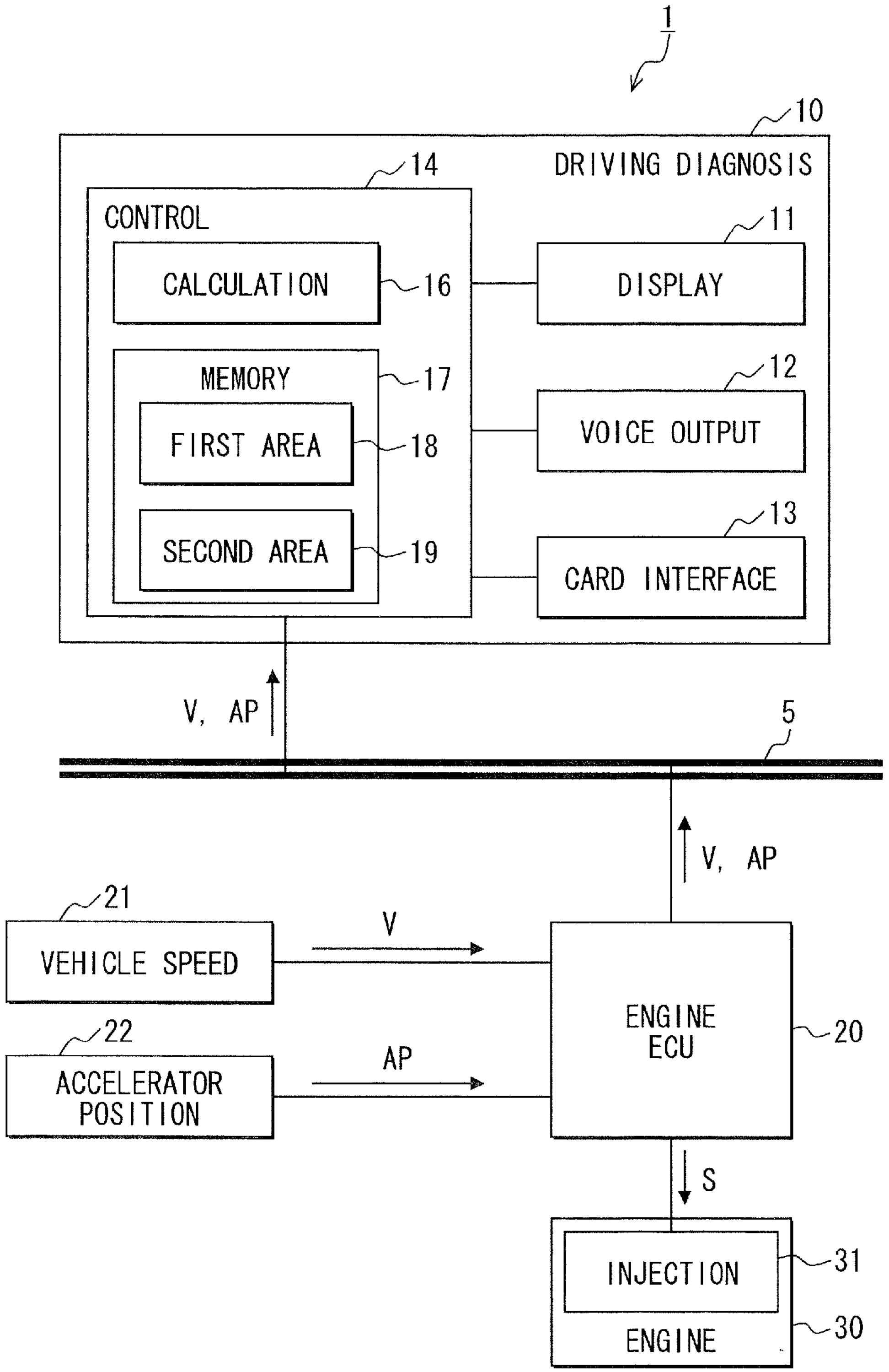
FIG. 1 is a block diagram of a driving diagnosis system according to an embodiment of the present invention.

Referring to FIG. 1, a driving diagnosis system 1 is provided in a subject vehicle that performs fuel cutoff, and measures a time length of fuel cutoff control during a deceleration (i.e., deceleration) of the subject vehicle. The time length of fuel cutoff control during the deceleration is hereafter designated as a required stopping time T. The measured time T is then used to diagnose (i.e., evaluate) a degree of fuel-efficient driving.

The driving diagnosis system 1 includes an engine electronic control unit (ECU) 20 for at least controlling a fuel injection device 31 disposed in an internal combustion engine 30 of the subject vehicle and a driving diagnosis apparatus 10 connected to the engine ECU 20 through an in-vehicle LAN 5.

Among those components, the engine ECU 20 is connected to a vehicle speed sensor 21, which detects a travel speed V of the subject vehicle, and an accelerator position sensor 22, which detects an accelerator pedal position AP of the subject vehicle (i.e., an accelerator operation state indicating a throttle position). Further, the engine ECU 20 is connected to other sensors, such as an engine speed detection sensor, which detects a rotation speed N of the engine 30 (i.e., engine rotation number per unit time), a crank angle sensor, which detects a crank angle of the engine 30, and the like.

The accelerator position sensor 22 is attached to an accelerator pedal, and outputs an accelerator position signal in proportion to an amount of pressing (i.e., an operation amount) of the accelerator pedal. The accelerator operation represented by the accelerator position signal is, (i) "0" when the accelerator pedal is not pressed on (i.e., the accelerator is in an OFF state), or (ii) a certain amount of pressing (i.e., an operation amount) if the accelerator pedal is pressed on.

The engine ECU 20 includes, as a main component, a well-known microcomputer having a CPU, a ROM, and a RAM. The engine ECU 20 determines a fuel injection timing and a fuel injection amount by well-known processing, based on the accelerator position signal AP, the engine rotation speed N, a crank angle and the like, and performs fuel injection control for injecting fuel into the engine 30 by outputting a control signal S to the fuel injection device 31. The engine ECU 20 performs, together with the above, fuel cutoff which cuts (i.e., stops) injection of fuel from the fuel injection device 31.

As known well, the fuel cutoff is performed when the accelerator is in an OFF state (i.e., accelerator position is "0") and the engine rotation speed N is equal to or greater than a fuel cutoff rotation speed NC1. Further, under the above condition in which the fuel cutoff is being performed, the fuel cutoff is cancelled when the accelerator changes to an ON state (i.e., accelerator position becomes greater than zero) or the engine rotation speed N becomes to or lower than a set rotation speed NR1, which is equal to or smaller than the fuel cutoff rotation speed NC1. Thus, the fuel injection state is restored to inject fuel to the engine 30 by stopping the currently-performed fuel cutoff. In this case, the set rotation speed NR1 is an engine rotation speed that is required to maintain an idling state of the engine 30.

The driving diagnosis apparatus 10 has, as a main component, a control apparatus 14 that is configured to perform various processing based on information from the engine ECU 20. The control apparatus 14 is connected to a display unit 11 for displaying images, a voice output unit 12 for outputting voice and sound, and a card interface unit 13 for writing information on a memory medium such as a memory card.

The control apparatus 14 includes a memory unit 17 having a first area 18 and a second area 19 respectively memorizing various information, and a calculation unit 16 for execution of processing programs and for controlling each of the above components 11, 12, 13.

The calculation unit 16 is configured to perform a processing program, which defines driving diagnosis processing that (i) measures a required stopping time T based on information from the engine ECU 20 and (ii) diagnoses (i.e., evaluates or assesses) a degree of fuel-efficient driving based on the measured time T.

Figure 2:
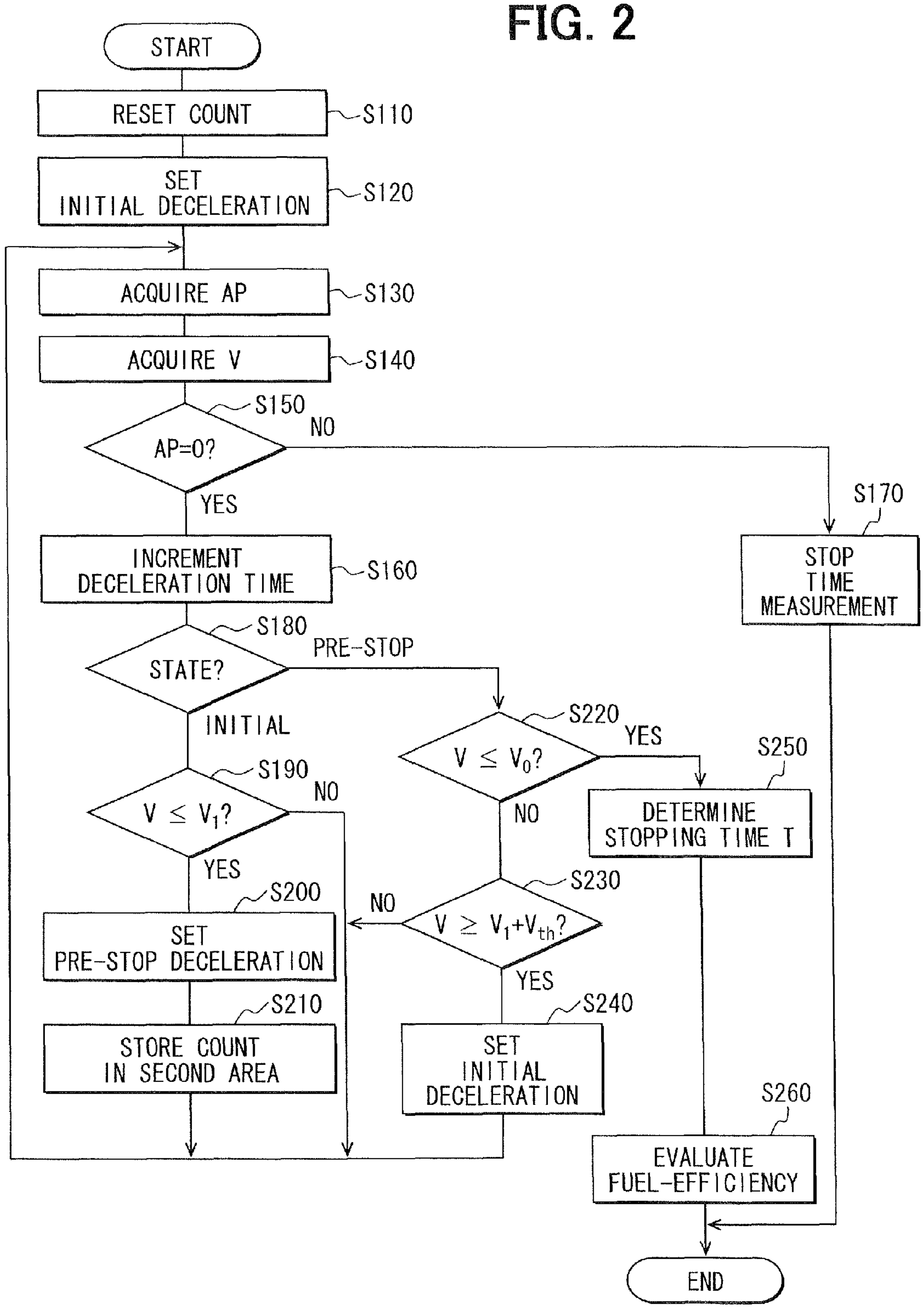
FIG. 2 is a flowchart of a driving diagnosis processing performed by a calculation unit of a driving diagnosis apparatus in the embodiment.

The driving diagnosis processing is performed by the calculation unit 16 in the driving diagnosis apparatus 10 as shown in FIG. 2 when the fuel cutoff is started, that is, when the subject vehicle traveling at a speed V that is equal to or greater than a predetermined speed (e.g., 20 km/h) and the accelerator position becomes "0" (i.e., accelerator OFF state). In such a case of the accelerator OFF state, the subject vehicle travels by inertia, or coasts, and starts to decelerate.

Then, after starting the driving diagnosis processing, at first, resetting of a count value (i.e., initialization to an initial value of "0") in a deceleration counter (deceleration counter) stored in the first area 18 of the memory unit 17 is performed (S110). The deceleration counter in the present embodiment is a counter for measuring a time length (i.e., lapse time) after the accelerator is put in the OFF state at a time of deceleration of the subject vehicle.

Then, state information about the travel state of the subject vehicle during the deceleration (i.e., STATE in FIG. 2) is set to "INITIAL DECELERATION" indicative of just after starting the deceleration (S120). In the present embodiment, "INITIAL DECELERATION" and "PRE-STOP DECELERATION" that indicate that the subject vehicle is immediately before coming to a complete stop are pre-provided as the state information.

Then, the accelerator position AP is acquired from the engine ECU 20 (S130), and the travel speed V of the subject vehicle is acquired from the engine ECU 20 (S140). Further, it is checked whether the accelerator position AP represented by the accelerator position signal acquired in S130 is equal to "0" (S150).

If, as a result of determination in S150, the accelerator position is not "0" (S150: NO) because the accelerator is in the ON state, the measurement of the lapse time (leading to measurement of the required stopping time) is stopped, by determining that the fuel supply to the engine 30 is started due to cancellation of fuel cutoff (S170). Thus, when the travel of the subject vehicle by a driving force from the engine 30 is re-started, the measurement of the lapse time is canceled, and the driving diagnosis processing is finished.

On the other hand, if, as a result of determination in S150, the accelerator position is "0," indicating the accelerator OFF state being kept unchanged (S150: YES), the count value of the deceleration counter stored in the first area 18 of the memory unit 17 is incremented by a predetermined amount of time length (S160). The increment in S160 is preferably a time length corresponding to an execution cycle of steps after S130 in the driving diagnosis processing.

Then, whether the state information (STATE) is either "INITIAL DECELERATION" or "PRE-STOP DECELERATION" is determined (S180). If it is determined that the state information is "INITIAL DECELERATION" as a result of determination in S180, it is then checked whether the travel speed V of the subject vehicle acquired in S140 is equal to or smaller than a preset pre-stop speed V1 (S190). The pre-stop speed V1 is a travel speed (e.g., 10 km/h) of the subject vehicle by the driving force generated by the engine 30 rotating at the set rotation speed NR1.

If the travel speed V of the subject vehicle is greater than the pre-stop speed V1 as a result of determination in S190 (S190: NO), it is determined that the current deceleration of the subject vehicle requires more time before the complete stop, and the process returns to S130 with the state information kept as "INITIAL DECELERATION."

On the other hand, if the travel speed V of the subject vehicle is equal to or smaller than the pre-stop speed V1 as a result of determination in S190 (S190: YES), it is determined that the subject vehicle is in a just-before-stopping state in the current deceleration, and the state information (STATE in FIG. 2) is set to "PRE-STOP DECELERATION" (S200). Then, the count value of the deceleration counter stored in the first area 18 of the memory unit 17 is also stored in the second area 19 of the memory unit 17 (S210). The count value of the deceleration counter stored in the first area 18 of the memory unit 17 is kept unchanged.

In case that the travel speed V of the subject vehicle falls down to be equal to or smaller than the pre-stop speed V1, while the count value of the deceleration counter stored in the first area 18 of the memory unit 17 is kept unchanged, the same count value is stored in the second area 19 of the memory unit 17 at a point of time when the travel speed V of the subject vehicle falls down to be equal to or smaller than the pre-stop speed V1. Then, the process returns to S130.

In this manner, after setting the state information to "PRE-STOP DECELERATION," the process proceeds to S180 to determine that the state information (STATE in FIG. 2) is "PRE-STOP DECELERATION," it is checked whether the travel speed V of the subject vehicle is equal to a predetermined stop speed V0 (S220). The stop speed V0 is defined as a speed that is lower than the pre-stop speed V1, and it may be a speed that the subject vehicle can be considered to be substantially in a stop state (e.g., speed of 0 to 0.5 km/h), for example.

Then, if it is determined that the travel speed V of the subject vehicle is greater than the stop speed V0 (S220: NO), it is checked whether the travel speed V of the subject vehicle is equal to or greater than a fuel cutoff cancellation speed V1+Vth (S230), which is predetermined. In addition, the fuel cutoff cancellation speed V1+Vth is a speed that is greater than the speed V1 by the amount of Vth, and is defined as a travel speed of the subject vehicle by the driving force of the engine 30 rotating at the fuel cutoff rotation speed NC1, for example.

If, as a result of determination in S230, the travel speed V of the subject vehicle is smaller than the fuel cutoff cancellation speed V1+Vth; (S230: NO), it is determined that the travel state of the subject vehicle is kept at the just-before-stopping state, and the process returns to S130, with the state information kept unchanged as "PRE-STOP DECELERATION."

On the other hand, if, as a result of determination in S230, the travel speed V of the subject vehicle is equal to or greater than the fuel cutoff cancellation speed V1+Vth (S230: YES), the state information (STATE in FIG. 2) is set to "INITIAL DECELERATION" (S240). It is determined that a state of the subject vehicle is changed, due to acceleration of the subject vehicle during the accelerator OFF state, to require more time to stop, the state information is changed back to "INITIAL DECELERATION."

Then, the process returns to S130. In this manner, when the process proceeds to S210 after changing the state information from "PRE-STOP DECELERATION" to "INITIAL DECELERATION," the count value of the deceleration counter stored in the second area 19 of the memory unit 17 is changed (i.e., updated) to the stored count value of the deceleration counter in the first area 18 of the memory unit 17 at that point of time.

In addition, if, as a result of determination in S220, the travel speed V of the subject vehicle is smaller than the stop speed V0 (S220: YES), the lapse time corresponding to the count value of the deceleration counter stored in the second area 19 of the memory unit 17 at a point of time when the travel speed V of the subject vehicle falls down to be equal to the stop speed V0 is determined as the required stop time T (S250). The required stopping time T is defined as a time length continuing (a) from a start of the fuel cutoff due to the accelerator OFF state (b) to the restart of fuel supply by the cancellation of fuel cutoff due to the travel speed V of the subject vehicle increasing to the pre-stop speed V1 immediately before falling down to the stop speed V0.

Based on the required stopping time T determined in S250, a degree of fuel-efficient driving regarding the driving of the subject vehicle (i.e., fuel-efficiency evaluation) is determined and evaluated (S260). For example, the fuel-efficiency evaluation determined in S260 is performed based on a driving diagnosis data map shown in FIG. 3. The driving diagnosis processing is then finished.

As exemplified in FIG. 3, data in a table form of the driving diagnosis data map coordinates evaluation grades to the length of the required stopping time T. Specifically, an evaluation grade is set higher for a longer required stopping time. This evaluation scheme is devised, because the longer distance can be traveled with lesser fuel consumption when the required stopping time is longer.

In addition, the fuel-efficiency evaluation determined in S260 may be displayed on the display unit 11, or it may be output by using a sound from the voice output unit 12. In addition, the fuel-efficiency evaluation in S260 may be stored in a memory medium through the card interface unit 13, and the stored evaluation may be analyzed in other information processing devices that are separate from the driving diagnosis apparatus 10.

An operation example of the driving diagnosis apparatus 10 is described next with reference to FIG. 5.

Figure 5:
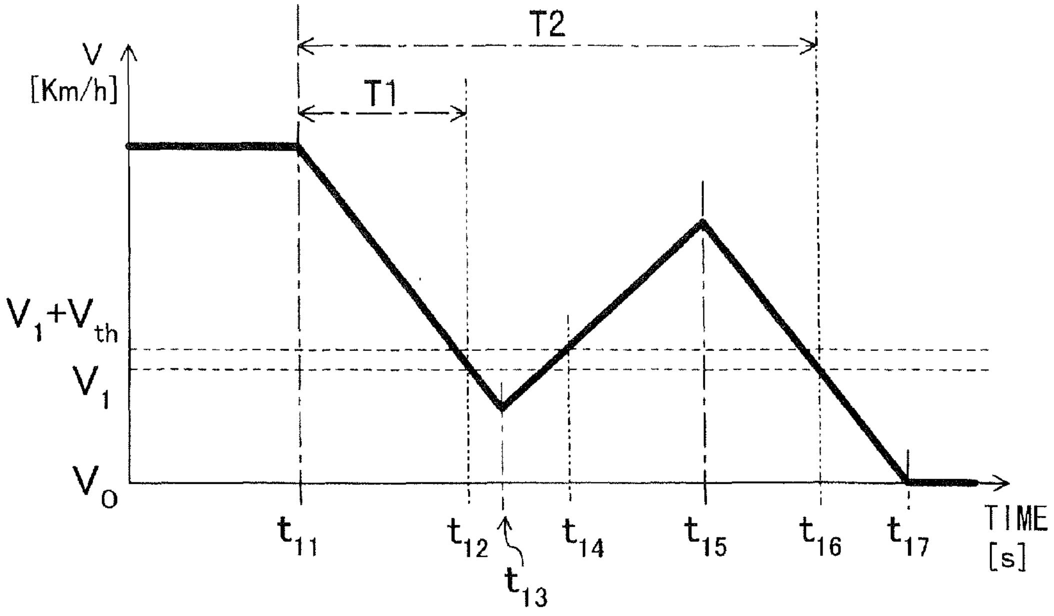
FIG. 5 is a time chart showing an operation of the embodiment of the present invention.
Figure 6:
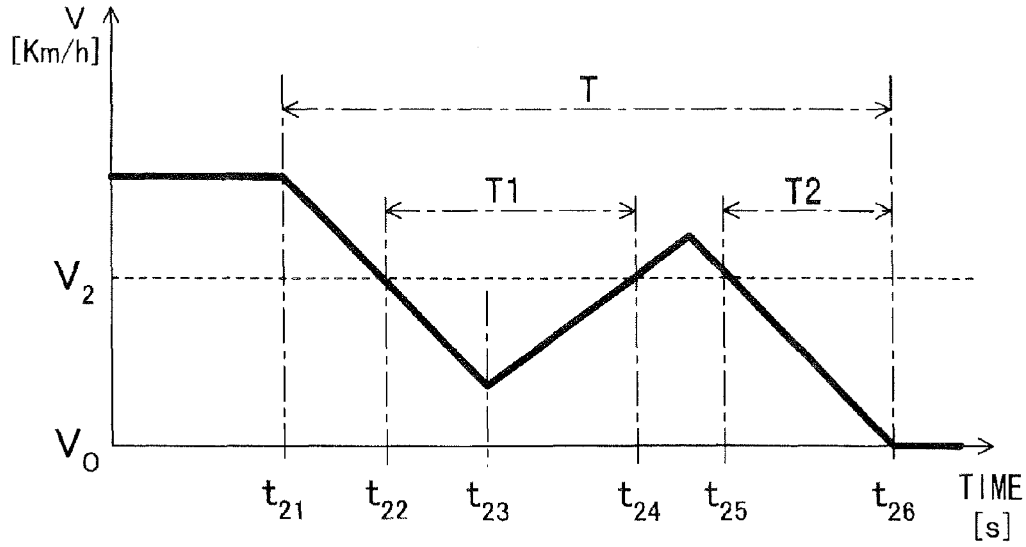
FIG. 6 PRIOR ART
FIG. 6 is a time chart showing an operation of a conventional apparatus.

In the following description, from the start of deceleration by putting the accelerator in the OFF state to stopping of the subject vehicle at a target stop position, the subject vehicle is assumed to travel on a downhill, that is, a road that includes a downward slope, without putting the accelerator in the ON state as shown in FIG. 5.

After starting the deceleration in the inertia travel by putting the accelerator in the OFF state (time t11), the driving diagnosis apparatus 10 starts to perform the driving diagnosis processing shown in FIG. 2, and starts to measure the lapse time after putting the accelerator in the OFF state (S160). When the travel speed V of the subject vehicle falls down to be equal to or lower than the pre-stop speed V1 (time t12), the measured lapse time T1 at time t12 is stored in the second area 19 of the memory unit 17 in S210, and the measurement of the lapse time is continued.

When the travel speed V of the subject vehicle falls down to be equal to or smaller than the pre-stop speed V1 (time t12), the engine ECU 20 cancels the fuel cutoff to restart the fuel injection. Then, at a time when the subject vehicle comes to the downward slope (time t13) and accelerates to have the travel speed V being equal to or greater than the fuel cutoff cancellation speed V1+Vth (time t14), the engine ECU 20 performs the fuel cutoff to stop the fuel injection and the driving diagnosis apparatus 10 sets the state information back to "INITIAL DECELERATION" in S240. In addition, a time length between (a) the falling down of the travel speed V of the subject vehicle to be equal to or smaller than the pre-stop speed V1 and (b) the exceeding of the travel speed over the fuel cutoff cancellation speed V1+Vth can be ignorable, because it is a short time in comparison to the required stopping time T.

Then, after the travel of the downward slope, the subject vehicle restarts the deceleration to have the travel speed V to be equal to or lower than the pre-stop speed V1, the driving diagnosis apparatus 10 stores (i.e., updates) the lapse time T2 up to that point of time t16 in the second area 19 of the memory unit 17, and continues to measure the lapse time. When the travel speed V of the subject vehicle further falls down to the stop speed V0 (time t17), the measurement of the lapse time is finished, and the lapse time T2 stored in the second area 19 of the memory unit 17 is determined as the required stopping time.

As described above, the required stopping time T determined by the driving diagnosis processing in the present embodiment is a length of time continuously measured from the start of performing the fuel cutoff due to the accelerator put in the OFF state to the restart of the fuel supply due to cancellation of the fuel cutoff. It is noted that the restart of the fuel supply in this case indicates a restart of the fuel supply at a time when the travel speed V of the subject vehicle becomes the pre-stop speed V1 immediately before becoming the stop speed V0.

Therefore, according to the driving diagnosis apparatus 10 of the present embodiment, even when a coasting vehicle traveling by inertia is in continuance of acceleration and deceleration, accuracy of measurement of the required stopping time T is improved.

More specifically, the driving diagnosis apparatus 10 starts to measure a new lapse time from an initial value, when the accelerator returns to an OFF state after an ON state, to start to travel by inertia, a new measurement of the lapse time is started from an initial value. Therefore, the driving diagnosis apparatus 10 of the present embodiment prevents erroneous measurement of a lapse time, that is, prevents erroneous measurement of the required stopping time T.

As a result, the driving diagnosis apparatus 10 can improve the accuracy of fuel-efficiency evaluation.

In the operation example of the embodiment, the fuel cutoff cancellation time is calculated. This fuel cutoff cancellation time consumes the same amount of fuel as the other period of vehicle's travel if the time length of the fuel cutoff cancellation time is the same as the time length of the other period, regardless of the condition of the road on which the subject vehicle is traveling. Therefore, even when the fuel cutoff cancellation time is included in the required stopping time, the degree of the fuel-efficiency evaluation is determined based on a time length that excludes the time length of the fuel cutoff cancellation time. There is substantially no chance that the fuel cutoff cancellation time affects the fuel-efficiency evaluation.

Further, by the output of the fuel-efficiency evaluation from the display unit 11 or from the voice output unit 12 under control of the driving diagnosis apparatus 10, a driver of the subject vehicle is encouraged to perform fuel-efficient driving.

In the above-described embodiment, step S150 in the driving diagnosis processing operates as an accelerator operation detection section, step S140 in the driving diagnosis processing operates as a speed acquisition section. Further, step S160 in the process during repetition of steps between S130 and S240 in the driving diagnosis processing operates as a duration measurement section. Further, step S210 in the driving diagnosis processing operates as a duration storage section, and step S250 in the driving diagnosis processing operates as a duration determination section. In addition, steps S170 and S110 in the driving diagnosis processing operates as a measurement cancellation section, and step S260 in the driving diagnosis processing operates as a driving diagnosis section.

Although the present disclosure has been fully described in connection with one preferred embodiment thereof with reference to the accompanying drawings, it is to be noted that various changes and modifications can be made.

For example, though the driving diagnosis data map has a higher evaluation level or the like for a longer required stopping time in the above embodiment, the evaluation scheme in the driving diagnosis data map is not limited to the above. That is, the evaluation level may be higher for a longer travelable distance during the required stopping time T, or the evaluation level may be higher for a smaller change of the acceleration during the required stopping time T.

Further, the driving diagnosis data map may have a driving diagnosis data for determining the fuel-efficiency evaluation as shown in FIG. 4, which defines a relationship between a deceleration start speed Vst and the required stopping time T in a manner that yields a higher evaluation level when (i) the required stopping time is longer, and (ii) the deceleration start speed Vst of the subject vehicle is lower at a start point of the required stopping time T, at which point of time the accelerator is put in the OFF state.

Furthermore, the fuel-efficiency evaluation may be determined based only on the deceleration start speed Vst. In such case, a lower deceleration start speed Vst may have a higher evaluation level. This is because, the lower the deceleration start speed Vst is, the braking is less possibly an abrupt one when the subject vehicle is stopped, which indicates that the driving is safer.

Furthermore, though the driving diagnosis processing of the embodiment determines the travel state of the subject vehicle to be either in "INITIAL DECELERATION" or "PRE-STOP DECELERATION" based on the travel speed V of the subject vehicle, the travel state of the subject vehicle may be determined based on the engine rotation speed N.

Furthermore, though the control apparatus 14 of the driving diagnosis apparatus 10 of the embodiment has the display unit 11, the voice output unit 12, and the card interface unit 13, the driving diagnosis apparatus 10 need not have each of those components 11, 12, 13. For example, at least one of those components 11, 12, 13 may be connected, or none of those components 11, 12, 13 may be connected.

What is claimed is:

1. A driving diagnosis apparatus for use in a vehicle, in which a fuel cutoff operation is performed in an accelerator OFF state of the vehicle, the OFF state indicates that the accelerator is not being depressed, such that (i) fuel supply to an internal combustion engine is stopped when a rotation speed of the engine is higher than a predetermined fuel cutoff speed, and (ii) the fuel supply to the engine is started again when the rotation speed of the engine is equal to or lower than a predetermined set speed lower than the predetermined fuel cutoff speed, the apparatus comprising:

- an accelerator operation detection section that detects an operation of an accelerator of a vehicle;
- a speed acquisition section that acquires a travel speed of the vehicle;
- a lapse time measurement section that measures lapse time of the accelerator OFF state based on a detection result of the accelerator operation detection section;
- a lapse time storage section that stores, in a memory unit, the lapse time measured by the lapse time measurement section up to a time point, at which the travel speed of the vehicle acquired by the speed acquisition section becomes equal to or lower than a predetermined pre-stop speed that indicates a travel speed of the vehicle driven by the engine rotating at the predetermined set speed; and
- a lapse time determination section that determines the lapse time stored in the memory unit as a required stopping time when the travel speed acquired from the speed acquisition section is equal to or lower than a predetermined stop speed that is smaller than the predetermined pre-stop speed, the required stopping time indicating a time length of inertia travel of the vehicle under the fuel cutoff operation reflecting fuel efficient driving, wherein the lapse time measurement section continues to measure the lapse time until the travel speed falls to the predetermined stop speed, if the accelerator remains in the accelerator OFF state, the lapse time storage section updates the lapse time stored in the memory unit each time the travel speed acquired from the travel speed acquisition section becomes equal to or lower than the predetermined pre-stop speed as long as the lapse time measurement section continues to measure the lapse time of the accelerator OFF state, and the lapse time determination section determines the required stopping time based on the lapse time updated immediately before the lapse time measurement section stops measurement of the lapse time at an end of the accelerator OFF state.

2. The driving diagnosis apparatus of claim 1 further comprising:

a measurement cancellation section that cancels the lapse time measurement by the lapse time measurement section and initializes the measured lapse time, when the accelerator is determined to be in an accelerator ON state based on a detection result of the accelerator operation detection section.

3. The driving diagnosis apparatus of claim 1 further comprising:

a driving diagnosis section that determines a driving evaluation of the vehicle based on the required stopping time determined by the lapse time determination section.

4. The driving diagnosis apparatus of claim 3, wherein:

the driving diagnosis section determines higher evaluation in the driving evaluation of the vehicle as the required stopping time is longer.

5. The driving diagnosis apparatus of claim 3, wherein:

the driving diagnosis section determines higher evaluation in the driving evaluation of the vehicle as the travel speed is lower at a start time of the accelerator OFF state, from which time the measurement of the required stopping time starts.

6. The non-transitory program storage product of claim 5, wherein the predetermined pre-stop speed is higher than the stop speed.

7. The driving diagnosis apparatus of claim 1, wherein the predetermined pre-stop speed is higher than the stop speed.

8. A non-transitory program storage product storing a computer readable program for controlling a computer to perform a driving diagnosis operation in a vehicle, in which a fuel cutoff operation is performed in an accelerator OFF state of the vehicle, the OFF state indicates that the accelerator is not being depressed, such that (i) fuel supply to an internal combustion engine is stopped when a rotation speed of the engine is higher than a predetermined fuel cutoff speed, and (ii) the fuel supply to the engine is maintained when the rotation speed of the engine is equal to or lower than a predetermined set speed lower than the predetermined fuel cutoff speed, the program storage product storing steps of:

detecting an operation of an accelerator of a vehicle;

acquiring a travel speed of the vehicle;

measuring lapse time of the accelerator OFF state based on a detection result of the step of accelerator operation detection;

storing the lapse time measured by the step of lapse time measurement up to a time point, at which the travel speed of the vehicle acquired by the step of speed acquisition becomes equal to or lower than a predetermined pre-stop speed that indicates a travel speed of the vehicle driven by the engine rotating at the predetermined set speed; and determining the lapse time stored by the step of storing as a required stopping time when the travel speed acquired by the step of the speed acquisition is equal to or lower than a predetermined stop speed that is smaller than the pre-determined pre-stop speed, the required stopping time indicating a time length of inertia travel of the vehicle under the fuel cutoff operation reflecting fuel efficient driving, wherein the step of lapse time measurement continues to measure the lapse time until the travel speed falls to the predetermined stop speed, if the accelerator remains in the accelerator OFF state, the step of storing updates the lapse time each time the travel speed acquired from the step of acquiring the travel speed becomes equal to or lower than the predetermined pre-stop speed as long as the step of measuring the lapse time continues to measure the lapse time of the accelerator OFF state, and the step of determining the lapse time determines the required stopping time based on the lapse time updated immediately before the step of measuring the lapse time stops measurement of the lapse time at an end of the accelerator OFF state.

9. The non-transitory program storage product of claim 8, further comprising steps of:

canceling the lapse time measurement by the step of lapse time measurement and initializing the measured lapse time, when the accelerator is determined to be in an accelerator ON state based on a detection result of the step of detecting the operation of the accelerator.

10. The non-transitory program storage product of claim 8, further comprising steps of:

determining a driving evaluation of the vehicle based on the required stopping time determined by the step of determining the lapse time.

11. The non-transitory program storage product of claim 10, wherein:

the step of determining the driving evaluation of the vehicle determines a higher evaluation in the driving evaluation of the vehicle as the required stopping time is longer.

12. The non-transitory program storage product of claim 10, wherein:

the step of determining the driving evaluation of the vehicle determines a higher evaluation in the driving evaluation of the vehicle as the travel speed is lower at a start time of the accelerator OFF state, from which time the measurement of the required stopping time starts.

* * * * *